United States Patent [19]

Woods

[11] 4,015,085

[45] Mar. 29, 1977

[54] CONTAINER FOR THE MICROWAVE HEATING OF FROZEN SANDWICHES

[75] Inventor: Francis J. Woods, Fort Worth, Tex.

[73] Assignee: Larry Lakey, Dallas, Tex. ; a part interest

[22] Filed: Apr. 30, 1975

[21] Appl. No.: 573,036

[52] U.S. Cl. .................. 219/10.55 E; 99/DIG. 14; 219/10.55 M; 426/107; 426/243

[51] Int. Cl.$^2$ .......................................... H02B 9/06

[58] Field of Search ............ 219/10.55 E, 10.55 M, 219/10.55 R, 339, 347; 99/DIG. 14; 426/107, 113, 124, 234, 237, 241, 243, 392, 396, 412

[56] References Cited

UNITED STATES PATENTS

| | | | |
|---|---|---|---|
| 3,271,169 | 9/1966 | Baker et al. ............ | 219/10.55 E X |
| 3,302,632 | 2/1967 | Fitchtner ................. | 219/10.55 E X |
| 3,490,580 | 1/1970 | Brumfield et al. ...... | 219/10.55 E X |
| 3,551,090 | 12/1970 | Brumfield et al. .......... | 219/10.55 E |

Primary Examiner—Arthur T. Grimley
Attorney, Agent, or Firm—Richards, Harris & Medlock

[57] ABSTRACT

A sandwich having a moisture containing bread base and a filler on top of said base enclosed in a nonmetallic film with means to accommodate selective heating in a controlled environment is provided with a conductive metallic layer between the bottom of the base and the nonmetallic film and is adapted for controlling a partial application of heat to the base relative to application of heat to the filler.

15 Claims, 4 Drawing Figures

CONTAINER FOR THE MICROWAVE HEATING OF FROZEN SANDWICHES

This invention relates to the control of heating of frozen or refrigerated edibles such as sandwiches.

The dispensing of convenience foods, particularly sandwiches preprepared and frozen or refrigerated for subsequent heating and consumption, is widely practiced. Rapid thawing of frozen foods heretofore has involved the use of microwave, infrared, quartz lamp and convection ovens for heating to a desirable and palatable state.

In one aspect of current practice, a stock of sandwiches is prepared and frozen and then transported to a business establishment from which they are to be dispensed. They are retained in frozen state until the day prior to the day that they are to be sold. Each day an operator will estimate the number of sandwiches required for the succeeding day, remove that number from the freezer and place them in a thawing environment overnight. The sandwiches thus prethawed are then heated, on order, in microwave or other ovens. Treatment of sandwiches in the frozen state in microwave ovens and other fast ovens has been found to make the bread unpalatable. During the thawing action, moisture present changes the texture of bread components rendering them rubbery to the feel and taste when heated.

Further, because of the inability accurately to estimate daily needs on the average for some operating segments in the coin operated dispenser industry, as high as 13 percent of the product is not used and is thrown away, resulting not only in the loss of the materials themselves but in a comparable proportional outlay to service scattered locations where such operations take place.

In another aspect of current practice, prepared sandwiches are assembled, transported and stored in refrigerated (not frozen) state and are then selectively heated in response to customers orders. The same undesirable effect as to the texture and taste response of the bread portions of the sandwich has been experienced.

Some effort has been made to avoid the problem by the use of special formula bread, but this results in increased cost and magnifying supply problems.

The present invention provides a prepackaged structure for a refrigerated or frozen sandwich which is to be directly utilized in a microwave oven without the undesirable results heretofore encountered.

In accordance with the invention, there is provided a sandwich having a frozen bread base and a frozen filler on top of the base and enclosed in a nonmetallic film with means to control the heating thereof directly from the frozen state comprising a conductive layer between the bottom of the base and the nonmetallic film for partial shielding of heat from the base relative to unshielded application of heat to the filler. A moisture absorbent layer may be interposed between the base and the metallic conductive layer.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
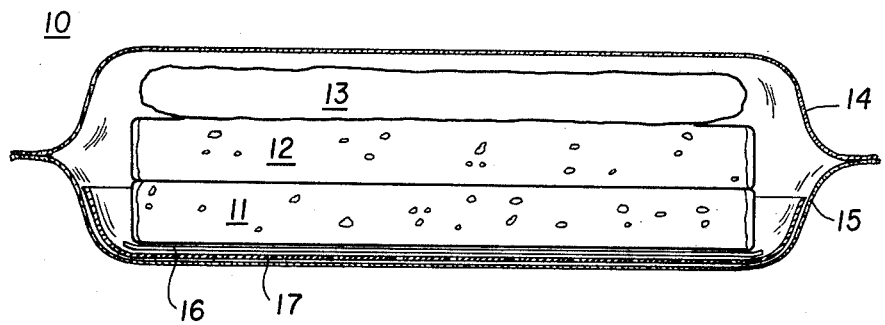
FIG. 1 is a sectional view of a sandwich construction embodying the present invention.

FIG. 1 illustrates a sandwich packaged in accordance with the present invention. The sandwich comprises a bread base including two slices of bread 11 and 12 topped by a filler such as cooked meat slices, cheese or other edibles forming a pattie 13. Normally, such prepared sandwiches are wrapped in a moisture impervious package such as represented by the packaging tube having upper and lower walls 14 and 15. The tube receives the sandwich in an open face state and walls 14 and 15 are sealed at the ends. Thereafter, the packaged sandwich is frozen and then is shipped to a dispensing point. In present practices, the sandwich normally is kept frozen until the day before it is to be used. The night before use is anticipated, the sandwich is removed from the deep freezer and is permitted to thaw overnight. It can then be placed in a microwave oven and heated to the desired state for consumption.

It has been found highly desirable to be able to heat frozen sandwiches directly from the deep frozen state. When packaged in accordance with prior art techniques, direct heating of a frozen sandwich causes a change in the constituency of the bread such that it becomes distasteful, unduly moist and rubbery. This condition has led to the practice of preliminarily thawing the sandwiches before microwave heating. However, such practice requires an estimate on the part of the dispenser as to how many sandwiches need to be taken out for thawing overnight for dispensing the following day. If fewer than estimated are required, the vendor faces a loss. If more are required than estimated, then it is necessary to take the excess required directly from a deep freeze, heat them, and then vend an unpalatable product. It has been found that the disadvantages attendant such prior art practices can be overcome by packaging the sandwich such that the bread base will be at least partially shielded from heat compared to the application of heat applied to the filler material.

As shown in FIG. 1, a layer 17 of a foil material shields base 11 and 12. It has been found that such shielding attenuates or alters the character of the heating of the bread base as to yield a palatable product while heating to high temperature the meat filler 13.

Figure 2:
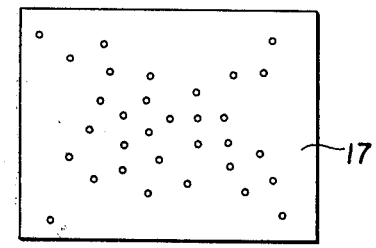
FIG. 2 illustrates a perforated shield for the sandwich base.

As shown in FIG. 2, the metallic base may be in the form of a sheet of aluminum foil perforated either on a pattern or randomly as shown in FIG. 2 so that about 5 to 10 percent of the total area of the shield 17 is removed. Holes ¼ inch in diameter on ¾ inch centers has been found suitable for bread such as generally known as cluster buns. The amount of shielding employed will be tailored to the type of bread with particular reference to the amount of moisture contained. Rye bread is most moist. Pullman loaves are less moist than rye nd more moist than cluster buns, the latter being more moist than bread units generally referred to as hard rolls. In general, the more moisture present the more shielding required. Increased shielding preferably is accomplished by increase in the distance between centers of the holes. Thus, there is a controlled application of heat to the bread base. Further to enhance the properties of the product, a moisture absorbent layer 16 may be provided between the shield 17 and the bases 11 and 12. Layer 16 serves to capture moisture that might otherwise be present in the region of the foil 17.

Figure 3:
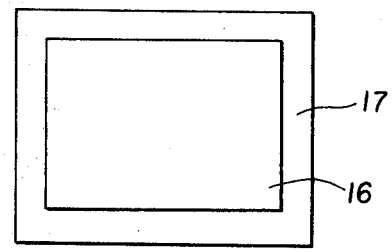
FIG. 3 illustrates the relation between the shield and an absorbent layer.

FIG. 3 illustrates the fact that the foil may be substantially larger than the moisture absorbent layer 16 so that foil 17 can extend up partially at the sides of the base 11 and 12.

Figure 4:
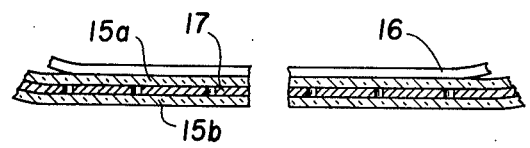
FIG. 4 illustrates a further embodiment of the shielding, protective structure.

In FIG. 4, a modification of the invention is shown wherein the shield 17 is an intermediate laminant for the lower portion 15 which has an upper layer 15a and a lower layer 15b. Layers 15a and 15b may be of cellophane and layer 17 may be aluminum foil. As in FIGS. 1–3, the shield 17 is perforated for 10 percent removal of the surface area. Thus, the present invention provides the solution to the need for a simple reliable method that makes it possible to package mixed food products in a single package to be stored or displayed in frozen or refrigerated equipment without opening the package to bring the various products to the proper serving temperature simultaneously without harming the palatability of any portion of the product. The example above described is a sandwich which consists of bread or bun with high moisture content, porous, large volume of low in weight and a meat portion of limited moisture content, dense, heavy and of small volume resulting in a composite product. A microwave oven normally overheats the bun and underheats the meat portion. Many dispensing operations do not have kitchen facilities, but their customers demand immediate hot food service. The same is true in an establishment such as drive-in grocery stores that may wish to provide hot food service for packaged foods that are simple to prepare and appeal to those customers who have limited time for meal preparation. Further, many homes are equipped with microwave ovens which lends utility to the present invention.

The present invention permits the direct transfer from a deep freeze unit to microwave oven while producing a totally desirable and palatable product. Foil layer 17 may be used in connection with regular packaging operations. The laminated foil shown in FIG. 4 may be used. The system is adaptable to flexible machine packaging as well as to hand wrapped products. The package may comprise an open topped paper tray coated with a perforated metallic layer with a cover sealed to the rim of the tray or with the tray overwrapped with cellophane. The metallic layer may be perforated foil or may be printed or painted with metallic ink or paint in manner partially to shield the bread portion. Thus, there is provided a conductive metallic layer covering the bottom of the sandwich base so that only partial application of microwaves applied to the filler portion is actually applied to and effective on the base portion.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for heating a frozen sandwich including a nonmetallic film enclosing said sandwich, the combination which comprises:
   a. a conductive metallic layer placed over the inner bottom surface of said film and adapted for partial deflection of microwave energy applied to said film;
   b. a moisture containing bread base placed over said metallic layer; and
   c. a sandwich filler placed over said bread base.

2. The combination of claim 1 in which a moisture absorbent layer is interposed between said bread base and said metallic layer.

3. The combination set forth in claim 1 in which said metallic layer has an array of perforations therein for passage of microwave energy therethrough to said bread base.

4. The combination of claim 3 in which said perforations are of the order of ¼ inch in diameter and of total area equal to about 5 to 10 percent of the area of said bread base.

5. The combination set forth in claim 1 in which the total area of at least one surface of said bread base directly exposed to said microwave energy is equal to about 5 to 10 percent of the area of said one surface.

6. A method of heating a frozen sandwich enclosed in a nonmetallic film and having a moisture containing bread base and a sandwich filler, which comprises:
   a. placing said filler on top of said bread base;
   b. hermetically sealing said filler and said bread base within said nonmetallic film;
   c. freezing said filler and said bread base;
   d. applying heat energy to said nonmetallic film; and
   e. partially shielding said bread base from said heat energy to provide a palatable food.

7. The method of claim 6, wherein the step of partially shielding includes the step of admitting said heat energy through a plurality of limited area paths distributed over the bottom of said bread base.

8. The method of claim 6, wherein said heat energy is microwave energy, and the step of partially shielding includes the step of directing said microwave energy through a plurality of limited area paths distributed across at least one surface of said bread base.

9. The method of claim 6 including the step of absorbing moisture in a zone immediately adjacent to said bread base.

10. A system for heating a frozen sandwich enclosed in a nonmetallic film, said sandwich having a frozen bread base and a frozen filler on top of said base, which comprises:
   a. a conductive metallic layer between the bottom of said base and said nonmetallic film adapted for only partial application of microwave energy to said base relative to the application of said microwave energy to said filler; and
   b. a moisture absorbent layer interposed between said base and said metallic layer.

11. A method of heating a frozen sandwich enclosed in a nonmetallic film and having a moisture containing bread base and a filler on top of said base, which comprises:
   a. applying heating energy in a controlled environment in which said sandwich is placed;
   b. shielding said base for only partial application of heat to said base relative to the application of heat to said filler; and
   c. absorbing moisture which may be present in a zone immediately adjacent to said base.

12. A frozen food container, which comprises:
   a. a first wall of nonmetallic film;
   b. a second wall of nonmetallic film hermetically sealed to said first wall and including:

i. an outer layer of nonmetallic film, and
ii. an inner layer of nonmetallic film;
c. a metallic layer interposed between said outer and said inner layers of said second wall for partially deflecting microwave energy directed therethrough; and
d. a moisture absorbent layer placed over said inner layer of said second wall to absorb moisture which may collect adjacent to said metallic layer.

13. The combination set forth in claim 12, wherein said metallic layer is perforated to remove 10 percent of its surface area.

14. The combination set forth in claim 12, wherein said second wall is cellophane and said metallic layer is aluminum.

15. The combination set forth in claim 12, wherein said metallic layer has a surface area exceeding the surface area of said moisture absorbing layer.

* * * * *